United States Patent
Touzeau et al.

[11] Patent Number: 6,061,569
[45] Date of Patent: May 9, 2000

[54] FREE CHANNEL DOUBLE CHECKING PROTOCOL AND SYSTEMS

[75] Inventors: Patrick Touzeau, Le Mans; Thierry P. F. Vaulay, Pruille-le-Chetif; Gabriel C. M. Fernandez, Le Mans, all of France

[73] Assignee: U.S. Philips Corporation, New York, N.Y.

[21] Appl. No.: 08/976,647

[22] Filed: Nov. 24, 1997

[30] Foreign Application Priority Data

Nov. 29, 1996 [EP] European Pat. Off. .............. 96402585

[51] Int. Cl.⁷ .............................. H04Q 7/34; H04Q 7/38
[52] U.S. Cl. .......................... 455/455; 455/450; 455/463; 455/464; 455/422
[58] Field of Search ..................................... 455/463, 464, 455/465, 462, 450, 452, 455, 422

[56] References Cited

U.S. PATENT DOCUMENTS

| | | | |
|---|---|---|---|
| 4,897,864 | 1/1990 | Murata et al. | 455/463 |
| 5,136,629 | 8/1992 | Toyama et al. | 455/464 |
| 5,259,020 | 11/1993 | Hirano | 455/463 |
| 5,644,621 | 7/1997 | Yamashita et al. | 455/464 |
| 5,835,889 | 11/1998 | Kapanen | 704/215 |
| 5,920,620 | 7/1999 | Mori | 379/408 |

OTHER PUBLICATIONS

"ETSI" document I–ETS 300 235 (Interim European Telecommunication Standard), European Telecommunications Standards Institute, Mar. 1994, pp. 9–16.

*Primary Examiner*—Reinhard J. Eisenzopf
*Assistant Examiner*—Eliseo Ramos-Feliciano
*Attorney, Agent, or Firm*—Daniel J. Piotrowski

[57] ABSTRACT

A free channel double checking protocol and system are disclosed. More particularly, the system includes at least one primary radio station and a plurality of secondary radio stations, in which a secondary radio station is matched to a primary radio station and a wireless communication is established via a full duplex communication link. The primary and the secondary stations establish the communication link using a free channel double checking protocol. The free channel doubles checking protocol checks whether a free channel exists between stations. After setting up the communication link, a calling station may confirm to a called station that a reliable communication link has been established.

9 Claims, 4 Drawing Sheets

FREE CHANNEL DOUBLE CHECKING PROTOCOL AND SYSTEMS

BACKGROUND OF THE INVENTION

The present invention relates to a telecommunications system comprising at least one primary radio station and a plurality of secondary radio stations, in which a secondary radio station is matched to a primary radio station and a wireless communication between matched radio stations is done via a full duplex communication link, and the primary and the secondary stations are arranged for establishing the communication link to their respective opposite station while scanning for a free communication channel, whereby the stations have a transmitter and a receiver. Such a telecommunications system can be a cordless telecommunications system in which radio stations are matched to each other via an identification code, or any other suitable system in which matched radio stations communicate with each other.

The present invention further relates to a channel selection protocol and a radio station for use in such a system.

A telecommunications system of the above kind is a known CT0 or CT1 cordless telephone readily available on the market. The known system can be a CT1 cordless telephone suitable for the European market. Such a system is standardised by ETSI, and the technical characteristics can be found in the ETSI document I-ETS 300 235, pages 9–16, March 1994. In such a system a full duplex radio channel is defined as a pair of channels with the portable part and for the fixed part. When a radio station is scanning for a free channel it checks whether the measured field strength is below a given threshold. The known system can also be a cordless telephone suitable for the US market For such a system the FCC makes available frequencies. In the latter system the radio channels for the fixed and portable part are not paired. In both systems there is a channel selection protocol to prevent call establishment of an occupied channel. In a system of paired channels, when a station scans for free channels when establishing a full duplex communication link, a corresponding channel is automatically taken. In the system of unpaired channels, the FCC prescribes that no occupied channel may be seized but no details are given how to achieve this object. Particularly in a system of unpaired channels, a reliable protocol is needed for up a fill, duplex communication link. Also in a system of paired channels, a problem can arise when automatically seizing a corresponding channel in the pair of channels. Specifically a busy channel adjacent to a free channel of the corresponding channel in the channel pair may with the free channel. In such a case half of the duplex link can be of such a bad quality that the communication is seriously disturbed.

OBJECTS AND SUMMARY OF THE INVENTION

It is an object of the present invention to provide a telecommunications system of matched radio stations in which a reliable full duplex link is set up.

Accordingly the present invention is characterised in that the station establishing the communication link is arranged for issuing an establishment request for establishing the communication link with the opposite station while applying a double checking protocol for checking whether both channels in the duplex communication link are free, which double checking protocol comprises the following steps:

a) after having found a free channel, the establishing station switches on its transmitter and transmits at least one activation message to the opposite station, b) after having received and decoded an activation message, the opposite station switches on its transmitter on a free channel and checks for a first predetermined period of time whether the establishing station has switched off its transmitter within the first period for channel on which its transmits the at least one activation message, c) the establishing station switches off its transmitter if a busy channel of the opposite station is found, d) if the channel is free, the opposite station transmits at least one acknowledgement message on the channel it has selected after having received the activation message, and e) the establishing station switches on its transmitter on the channel it was transmitting the at least one activation message after having received and decoded the acknowledgement message. Because the reliability of both channels is checked it is guaranteed that no half busy radio link is set up. It is essential that after the transmission of the activation messages, can the calling station switches off its transmitter. Only then, the called station detect that the received channel is free when double checking.

In an embodiment of a telecommunications system according to the present invention, the establishing station checks whether the opposition station has seized a channel for the full duplex communication link after a second predetermined period of time after it has first switched on its transmitter. Thus, it is avoided that the calling station, i.e. the link establishing station, waits for an endless period of time if it did not see a busy channel of its matched station with an establishment request. To avoid that matched stations, such as a fixed part and a portable part of a cordless telephone, try to establish a radio link at the same time, at the side of the portable part, before issuing the establishment request, all radio channels are scanned without the portable having its transmitter on. Herewith, always one station of two matched stations can first check whether there is no establishment request from the matching station. If this is done by the portable part, preference is given to incoming calls from the fixed part, or to intercom requests.

In an embodiment of a telecommunications system according to the present invention, the establishing station checks whether after a third predetermined period of time after having switched off its transmitter the acknowledgement message was received. Herewith, it is avoided that the establishing station waits for an endless period of time after having switched off its transmitter for an acknowledgement message from the called station.

In another embodiment of a telecommunications system according to the present invention, the opposite station checks whether after a fourth predetermined period of time after having issued an acknowledgement message it has received user data from the establishing station confirming the link establishment and enters a channel scanning mode if it has not received such confirmation data. Herewith, the called station knows that the called station has received its acknowledgement message and that a reliable communication can be made.

In still another embodiment of a telecommunications system according to the present invention, the activation message is transmitted repetitively and continuously and the acknowledgement message is transmitted repetitively for a predetermined number of times. Herewith, within said time out periods, the chance is greater that the calling and called stations see the respective channels.

BRIEF DESCRIPTION OF THE DRAWINGS

The present invention will now be described, by way of example, with reference to the accompanying drawings, wherein FIG. 1 schematically shows a cordless telecommunications system according to the present invention.

Throughout the figures the same reference numerals are used for the same features.

DETAILED DESCRIPTION OF THE PREFERRED EMBODIMENT

Figure 1:
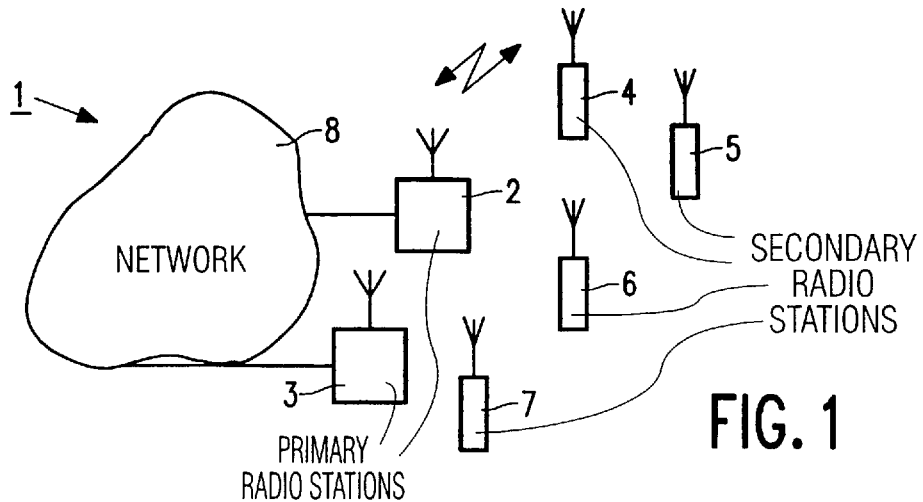

FIG. 1 schematically shows a shows a cordless telecommunications system 1 comprising primary radio stations 2 and 3, and secondary radio stations 4, 5, 6 and 7. The radio stations 2, 4, 5 and 6 are matched to each other in that they all have the same identification code. These stations form a so-called multi-handset cordless telephone according to the CT0 Standard or the CT1 Standard, for instance. Stations 3 and 7 are also matched to each other. The secondary stations 2 and 3 are coupled to the public switched telephone network 8. The shown devices are suitable for at least telephony speech traffic.

Figure 2:
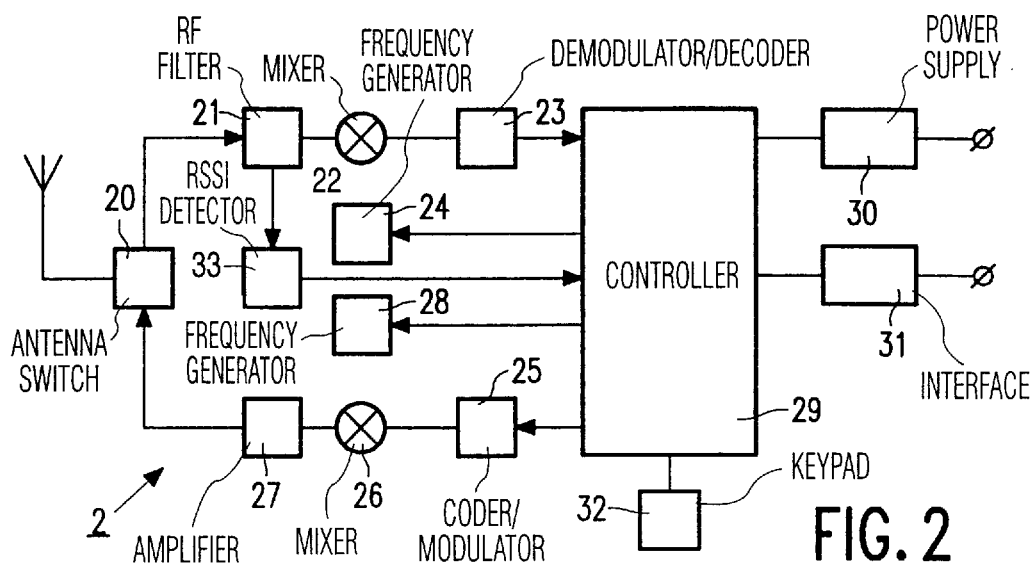
FIG. 2 shows a block diagram of the primary station according to the present invention.

FIG. 2 shows a block diagram of the primary station 2 according to the present invention. Station 2 comprises a reception path and a transmission path coupled to an antenna switch 20. The reception path comprises a cascade of a tuneable RF-filter 21, a mixer 22, a demodulator/decoder 23. The mixer 22 is further coupled to tuneable frequency generation means 24 so that the receiver can be tuned to a given channel. The transmission path comprises a cascade of the coder/modulator 25, a mixer 26, and a power amplifier 27. The mixer 26 is further coupled to tuneable frequency generating means 28. A micro controller 29 having a programmed ROM (Read Only Memory) and/or a programmed EEPROM (Electrically Alterable Programmable Read Only Memory) and a RAM (Random Access Memory) is provided for controlling the functionality of the primary station 2. The micro controller 29 is further coupled to a power supply 30 and to a line interface circuit 31 for coupling the primary station 2 to the public switched telephone network 8. Conventional functionality such as controlling the frequency generating means 24 and 28 so as to tune to a specific frequency channel and scanning an (optional) keypad 32, is not described in further detail here, such functioning being well-known in the art. The primary station 2 comprises an RSSI detector Received Signal Strength Indicator) 33 coupled between the RF-filter 21 and the micro controller 29 for measuring the field strength of the received signal in the channel to which the primary station is tuned.

Figure 3:
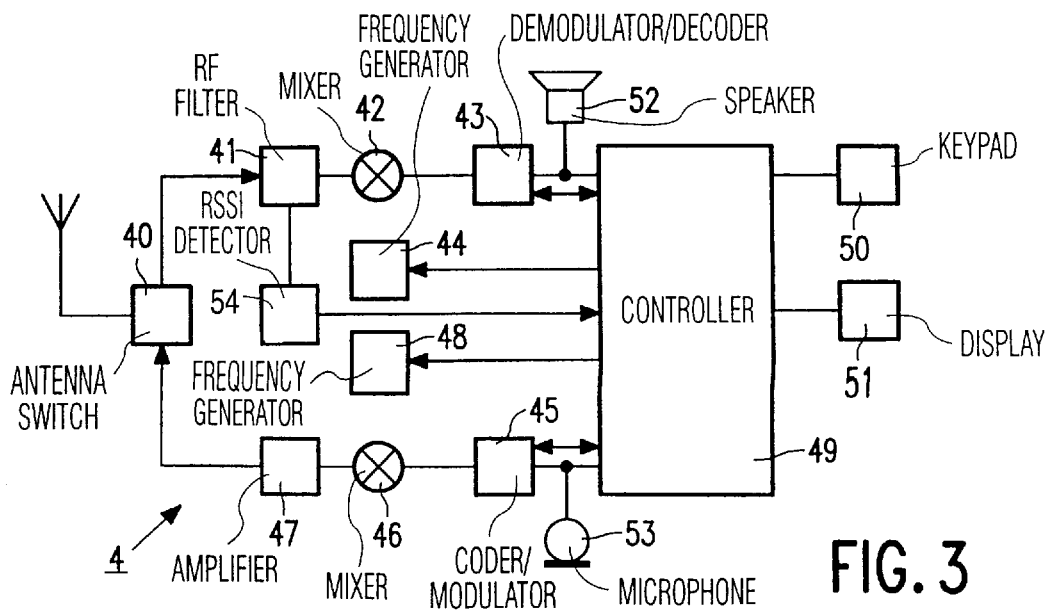
FIG. 3 shows a block diagram of the secondary station according to the present invention.

FIG. 3 shows a block diagram of the secondary station 4 according to the present invention. The station 4 comprises a reception path and a transmission path coupled to an antenna switch 40. The reception path comprises a cascade of a tuneable RF-filter 41, a mixer 42, a demodulator/decoder 43. The mixer 42 is further coupled to tuneable frequency generation means 44 so that the receiver can be tuned to a given channel. The transmission path comprises a cascade of the coder/modulator 45, a mixer 46, and a power amplifier 47. The mixer 46 is further coupled to tuneable frequency generating means 48. A micro controller 49 having a programmed ROM (Read Only Memory) and/or a programmed EEPROM (Electrically Alterable Programmable Read Only Memory) and a RAM (Random Access Memory) is provided for controlling the functionality of the secondary station 4. The micro controller 49 is further coupled to a keypad 50 and to a display 51. The demodulator/decoder 43 is coupled to a speaker 52 in the receive path and to the micro controller 49. The coder/modulator 45 is coupled to a microphone 53 in the transmit path. Conventional functionality such as controlling the frequency generating means 44 and 48 so as to tune to a specific frequency channel and scanning the keypad 50, is not described in further detail here, such functioning being well-known in the art. In the example given, voice signals are transmitted over the air interface as FM (Frequency Modulated) signals modulated on a carrier, and messages to be transmitted over the air interface are Manchester coded binary messages which can be evaluated by the micro controllers 29 and 49, after demodulation and decoding. Such Manchester coded messages and FM are well-known in the art. The programmed micro controllers 29 and 49 contain suitable parts of the programs for implementing the protocols according to the present invention. The secondary station 4 comprises an RSSI detector (Received Signal Strength Indicator) 54 coupled between the RF-30 filter 41 and the micro controller 49 for measuring the field strength of the received signal in the channel to which the secondary station is tuned.

Figure 4:
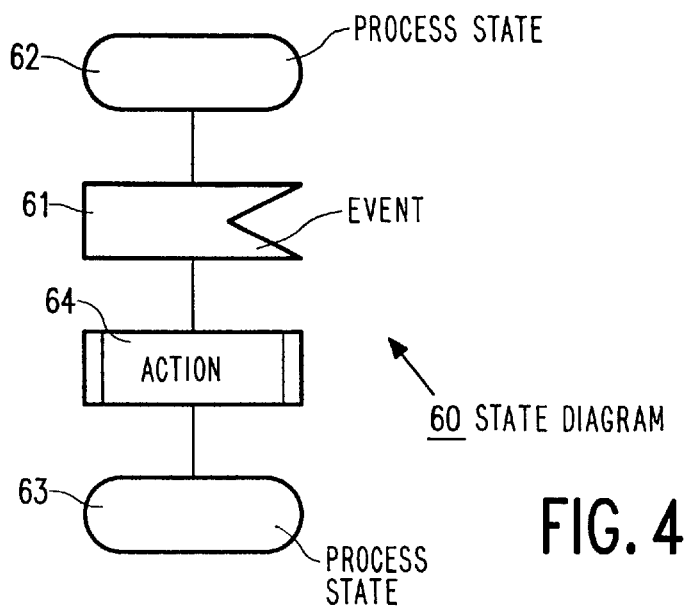
FIG. 4 shows a state diagram for illustrating the operation of the programs according to the present invention.
Figure 5:
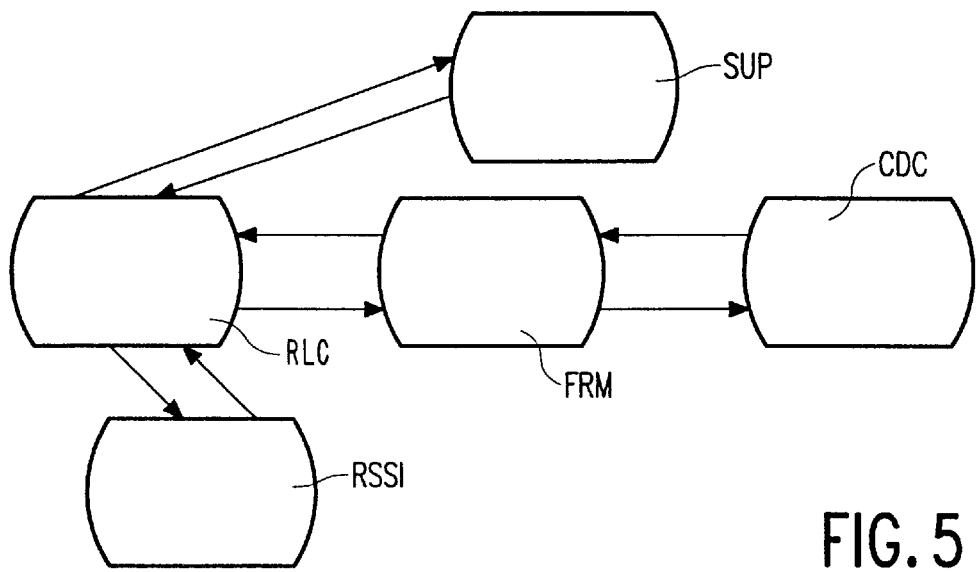
FIG. 5 shows the processes to implement the protocols according to the present invention.

FIG. 4 shows a state diagram 60 for illustrating the operation of the programs according to the present invention. The programs are a set of real time software processes which are event driven, i.e., if a particular event occurs, such as an event 61, a transition occurs from a process state 62 to another process state 63 after an action 64 has been carried out. Events can also cause a jump to a state of another process. Such an organisation of software in the form of finite state machines is well-known in the arts FIG. 5 shows the processes to implement the protocols according to the present invention. Processes can send events to another process. Shown are a layer-1 CODEC process CDC, a layer-2 FRAME process FRM, a layer-3 Radio Link Control process RLC, a higher layer Supervisor process SUP, and a layer-1 +process RSSI. Arrows indicate software channels for exchanging events between processes. Such a layer structure of software and exchanging of events is well-known per se. Layer-1 is usually called the physical layer via which signals are conveyed from the primary station 2 to the secondary station 4, and vice versa. At layer-2 Frames of messages are built, at layer-3 radio link control is done, and at the higher layers higher level software is run at a supervisor level. In the sequel, the operation of the protocols according to the present invention will be described in terms of event driven software processes and the timing thereof.

Figure 6:
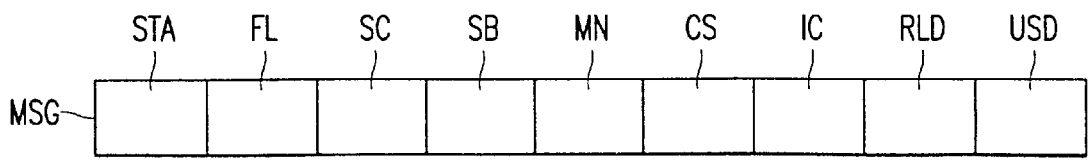
FIG. 6 shows a message format MSG for events.

FIG. 6 shows a message format MSG for the above events. The message MSG is a variable length message comprising the following message fields, a 16 bits Start field STA, a 5 bits Frame Length field FL, a 1 bit Scramble-bit field SC, a 2 bits Stream Bits field SB, an 8 bits Mobile Number field MN, an 8 bits Checksum field CS, a 16 bits Identification Code field IC, an 8 bits Radio Link Data field RLD, and an N*8 bits Application User Data field USD. The field STA contains a Manchester code word for synchronisation which is different for the primary station 2 and the secondary station 4 so as to avoid self-reception of frames. The two bits SB change with each transmission of the same message. Herewith, it is avoided that the same message (e.g. message content) is not seen as a new message and the software operates more efficiently. The Mobile Number MN is used with point to point radio links. Herewith, handsets in a multi-handset cordless phone can be distinguished. For distinguishing handsets belonging to a given base, the Identification Code is put in each frame. The user data contains information belonging to a particular radio link. The user data field USD is of variable length N, N being an integer value varying from 0 to a given positive value.

Figure 7:
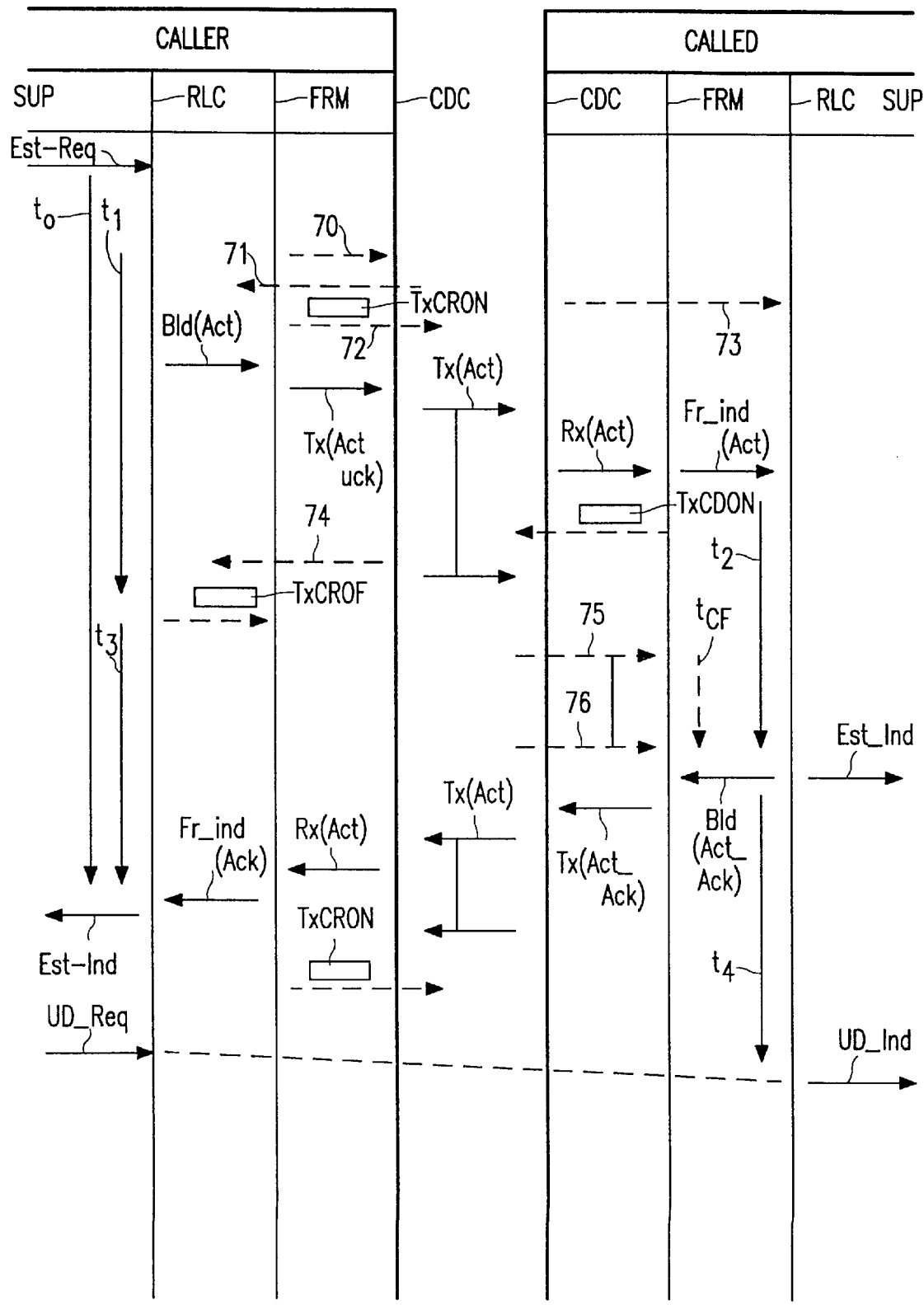
FIG. 7 shows a signalling diagram for the double checking protocol according to the present invention.

FIG. 7 shows a signalling diagram for the double checking protocol according to the present invention. Shown are a calling station CALLER and a called station CALLED. The CALLER and the CALLED can be a primary station and a secondary station, and vice versa. A point to point radio link is set up. Shown are the events between the software processes as described as a function of time. Time evolves from the top of the diagram to the bottom of the diagram. At the level of the Supervisor SUP, so-called Primitives are generated initiating basic processes. In FIG. 7, the Primitive Est_Req is generated, initiating call establishment. The RSSI process is not indicated separately but is still present, this being indicated with dashed arrows. If a handset is the CALLER, this handset first carries out a complete channel scanning cycle so as to check whether the base station has not already initiated a call establishment protocol. In 70, the CALLER checks for a free channel by evaluating its RSSI signal, a free channel being indicated to the process RLC of the CALLER. Then, the CALLER switches on its transmitter, indicated with TXCRON so that the CALLED detects a busy channel occupied by the CALLER, indicated with 72 and 73. Thereafter, the CALLER's process RLC issues an event Bld(Act) to its process FRM for building up an Activation message Act. The activation message Act is assembled in a message format as described in FIG. 6, the message type being distinguished in the Radio Link Data Field RLD. The CALLER's process FRM issues an event Tx(Act, UCR) to its layer-1 Codec process CDC. Herewith, activation messages are sent to the Codec process of the CALLED via the air interface in an Unlimited Continuous Repetition mode UCR. This is indicated with connected arrows Tx(Act). The CALLED receives the activation message Rx(Act) and the CALLED's frame process FRM disassembles the received frame and informs its radio link control process RLC that it has received an activation message Act by issuing an event Fr_ind(Act). Then, the CALLED switches on its transmitter, indicated with TxCDON so that the CALLER's process RSSI detects a CALLER's busy channel, indicated with 74. It is essential that the CALLER now switches off its transmitter, indicated with TXCROF so that the CALLED sees a free channel. After the CALLER has switched off its transmitter, the CALLED should see the corresponding channel free for a period of time $t_{CF}$. This is because in the meantime another caller could have seized the free channel. In fact, the CALLED should see the channel free for the whole period $t_2$, from the instant it had switched on its transmitter until the end of the period $t_{CF}$, but because of the fact that the CALLER should first switch off its transmitter, the actual scanning period is $t_{CF}$. Channel free is indicated with the connected dashed arrows 75 and 715. After the CALLED is convinced to have found a free channel, its radio link process RLC informs its supervisor SUP, indicated with the event Est_Ind. Then, the CALLER builds an activation acknowledgement frame at an event Bld(Act_Ack) and transmits an activation acknowledge message to the CALLER at an event Tx(Act_Ack) via the air interface in a Limited Continuous Repetition mode LCR, i.e., the acknowledgement message is transmitted a given number of times, indicated with the connected arrows Tx(Ack). On reception of the acknowledgement message, the CALLER's process CDC issues an event Rx(Ack) to its frame disassembling process FRM, which process issues an event Fr_Ind(Ack) to its radio link control process RLC, which process issues an event Est_Ind to its supervisor SUP. Herewith, the point to point radio link is established and the CALLER switches on its transmitter, indicated with TxCRON. For confirmation of the established radio link, the CALLER transmits user data to the caller, initiating of transmission being indicated with the Primitive UD_Req and reception at supervisor level being indicated with UD_Req. The Primitive UD_Req will be described in FIG. 8. To prevent endless waiting by the CALLER or the CALLED, time outs are applied when waiting for a response of the other party. At supervisor level at the side of the CALLER, within a time out to the supervisor should be informed that the link is established by receiving the event Est_Ind. Similarly, time outs $t_1$, and $t_3$ are defined for the CALLER's radio link control process RLC, and a time out $t_4$ for the CALLED's radio link process RLC. At an elapse of a time out, the entity adopts a channel scanning mode again.

Figure 8:
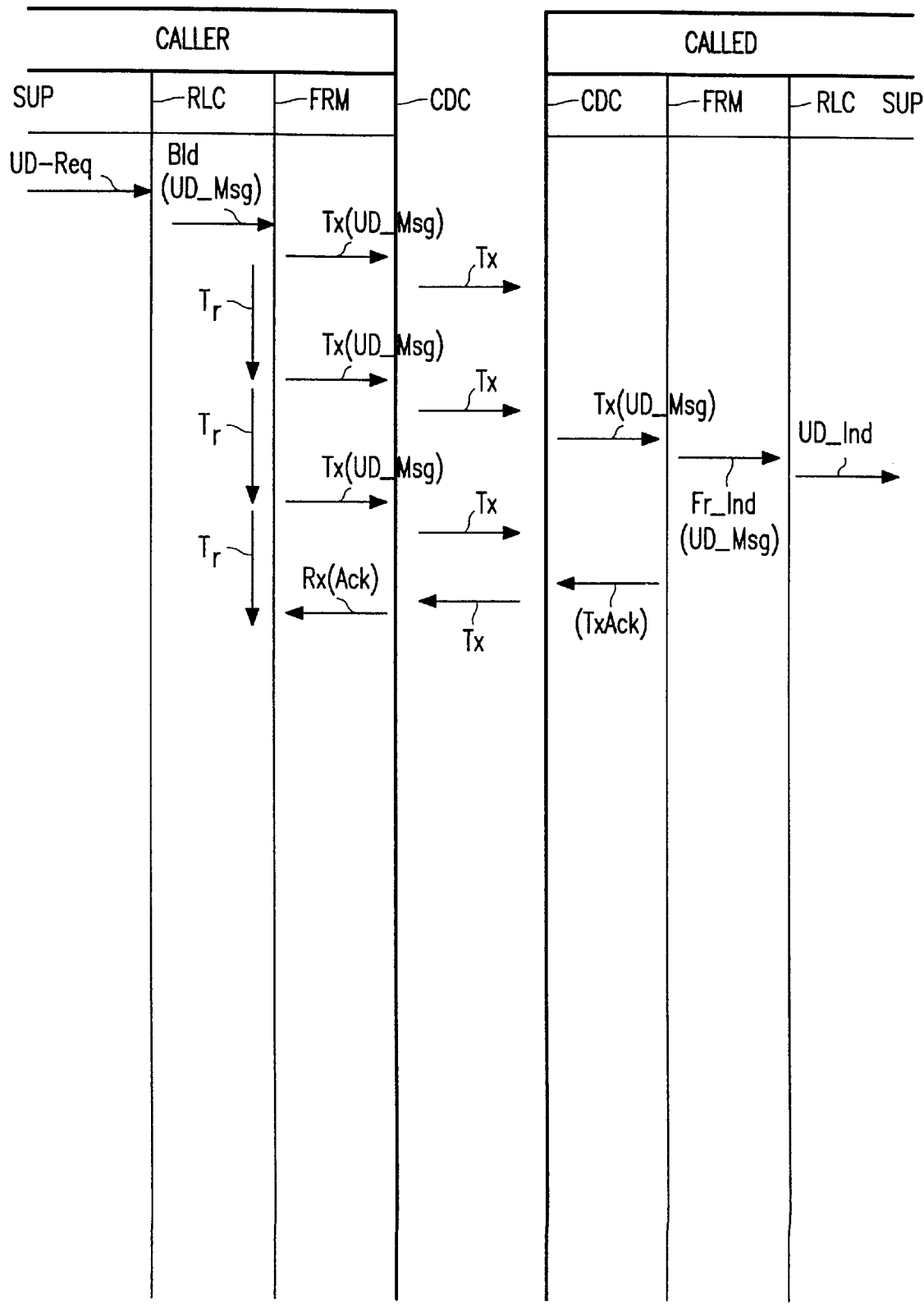
FIG. 8 shows a signalling diagram for transmission of user data in a double checking protocol according to the present invention.

FIG. 8 shows a signalling diagram for transmission of user data in a double checking protocol according to the present invention. User defined messages are transmitted via an already established radio link. The CALLER's supervisor issues an event UD_Req to its radio link process RLC, which process issues a frame building event Bld(UD_Msg) to its frame process FRM, which process issues a transmit user defined message to its codec CDC. The contents of the user defined message UD_Msg depends on the application thereof. In the given example, the user defined message is used for radio link confirmation. The user defined message is transmitted a number of times, in the given example three times, at regular intervals $T_r$. If after the third transmission no acknowledgement is received, the CALLER will release the radio link before returning to idle mode. Reception of the user defined message is indicated by the events Rx(UD_Msg), Fr_Ind(UD_Msg), and UD_Ind. Transmission and reception of an acknowledgement message is indicated by the events Tx(Ack) and Rx(Ack).

In view of the foregoing it will be evident to a person skilled in the art that various modifications may be made within the spirit and the scope of the present invention as hereinafter defined by the appended claims and that the present invention is thus not limited to the examples provided.

What is claimed is:

1. A telecommunications system comprising at least one primary radio station and a plurality of secondary radio stations, in which system a secondary radio station is matched to a primary radio station and a wireless communication between matched radio stations is done via a full duplex communication link, and the primary and the secondary stations are arranged for establishing the communication link to their respective opposite station while scanning for a free communication channel, whereby the stations have a transmitter and a receiver, characterised in that the station establishing the communication link is arranged for issuing an establishment request for establishing the communication link with the opposite station while applying a double checking protocol for checking whether both channels in the duplex communication link are free, which double checking protocol comprises the following steps:
- a) after having found a free channel, the establishing station switches on its transmitter and transmits at least one activation message to the opposite station,
- b) after having received and decoded an activation message, the opposite station switches on its transmitter on a free channel and checks for a first predetermined period of time whether the establishing station has switched off its transmitter within the first period on the channel on which its transmits the at least one activation message,
- c) the establishing station switches off its transmitter after having found a busy channel of the opposite station,
- d) if is ascertained that after the checking in b) the channel is free, the opposite station transmits at least one acknowledgement message on the channel it has selected after having received the activation message, and
- e) the establishing station switches on its transmitter on the channel it was transmitting the at least one activation message after having received and decoded the acknowledgement message.

2. A telecommunications system according to claim 1, wherein the establishing station checks whether after a second predetermined period of time after it has first switched on its transmitter the opposite station has seized a channel for the full duplex communication link.

3. A telecommunications system according to claim 1, wherein the establishing station checks whether after a third predetermined period of time after having switched off its transmitter the acknowledgement message was received.

4. A telecommunications system according to claim 1, wherein the opposite station checks whether after a fourth predetermined period of time after having issued an acknowledgement message it has received user data from the establishing station confirming the link establishment and enters a channel scanning mode if it has not received such confirmation data.

5. A telecommunications system according to claim 1, wherein the activation message is transmitted repetitively and continuously.

6. A telecommunications system according to claim 1, wherein the acknowledgement message is transmitted repetitively for a predetermined number of times.

7. A channel selection protocol for use in a telecommunications system comprising at least one primary radio station and a plurality of secondary radio stations, in which system a secondary radio station is matched to a primary radio station and a wireless communication between matched radio stations is done via a full duplex communication link, and the primary and the secondary stations are arranged for establishing the communication link to their respective opposite station while scanning for a free communication channel, whereby the stations have a transmitter and a receiver, characterised in that the station establishing the communication link issues an establishment request for establishing the communication link with the opposite station while applying a double checking protocol for checking whether both channels in the duplex communication link are free, which double checking protocol comprises the following steps:
- a) after having found a free channel, the establishing station switches on its transmitter and transmits at least one activation message to the opposite station,
- b) after having received and decoded an activation message, the opposite station switches on its transmitter on a free channel and checks for a first predetermined period of time whether the establishing station has switched off its transmitter within the first period on the channel on which its transmits the at least one activation message,
- c) the establishing station switches off its transmitter after having found a busy channel of the opposite station,
- d) if is ascertained that after the checking in b) the channel is free, the opposite station transmits at least one acknowledgement message on the channel it has selected after having received the activation message, and the establishing station switches on its transmitter on the channel it was transmitting the at least one activation message after having received and decoded the acknowledgement message.

8. A first radio station for use in a telecommunications system comprising at least one primary radio station and a plurality of secondary radio stations, in which system a secondary radio station is matched to a primary radio station and a wireless communication between matched radio stations is done via a full duplex communication link, and the primary and the secondary stations are arranged for establishing the communication link to their respective opposite station while scanning for a free communication channel, whereby the stations have a transmitter and a receiver, characterised in that the first radio station is arranged for establishing the communication link by issuing an establishment request for establishing the communication link with a second station while applying a double checking protocol for checking whether both channels in the duplex communication link are free, which double checking protocol comprises the following steps to be carried out by the first station:
- a) after having found a free channel, the first station switches on its transmitter and transmits at least one activation message to the second station,
- b) the first station switches off its transmitter after having found a busy channel of the second station, which channel was seized by the second station after having received and decoded an activation message, after which the second station had switched on its transmitter on a free channel and had initiated checking for a first predetermined period of time whether the first station had switched off its transmitter within the first period on the channel on which it had transmitted the at least one activation message, and
- c) the first station switches on its transmitter on the channel it was transmitting the at least one activation message after having received and decoded an acknowledgement message received from the second station on the channel it had selected after having received the activation message.

9. A second radio station for use in a telecommunications system comprising at least one primary radio station and a plurality of secondary radio stations, in which system a secondary radio station is matched to a primary radio station and a wireless communication between matched radio stations is done via a full duplex communication link, and the primary and the secondary stations are arranged for establishing the communication link to their respective opposite station while scanning for a free communication channel, whereby the stations have a transmitter and a receiver, characterised in that the second radio station is arranged for evaluating an establishment request for establishing the communication link received from a first station issuing an establishment request for establishing the communication link with the second opposite station while applying a double checking protocol for checking whether both channels in the duplex communication link are free, which double checking protocol comprises the following steps to be carried out by the second station:

a) after having received and decoded an activation message, which was transmitted by the first station after having found a free channel and having switched on its transmitter, the second station switches on its transmitter on a free channel and checks for a first predetermined period of time whether the establishing station has switched off its transmitter within the first period on the channel on which its transmits the at least one activation message, b) the second station transmits at least one acknowledgement message on the channel it has selected after having received the activation message when it had found that the first station had switched off its transmitter.

* * * * *